Sept. 9, 1969   L. P. SIEBERT   3,465,766
AMBULATORY IRRIGATING DEVICE
Filed April 28, 1967   5 Sheets-Sheet 1
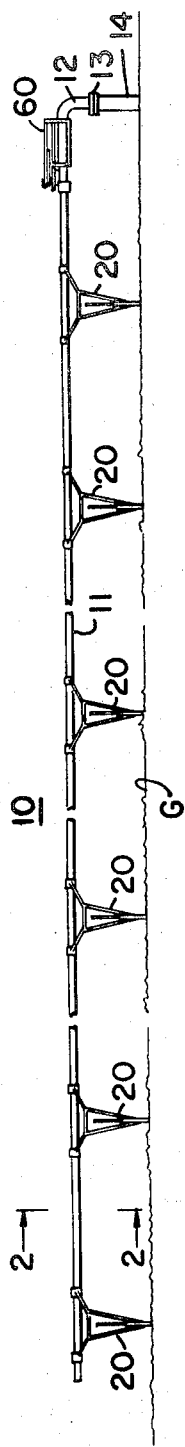
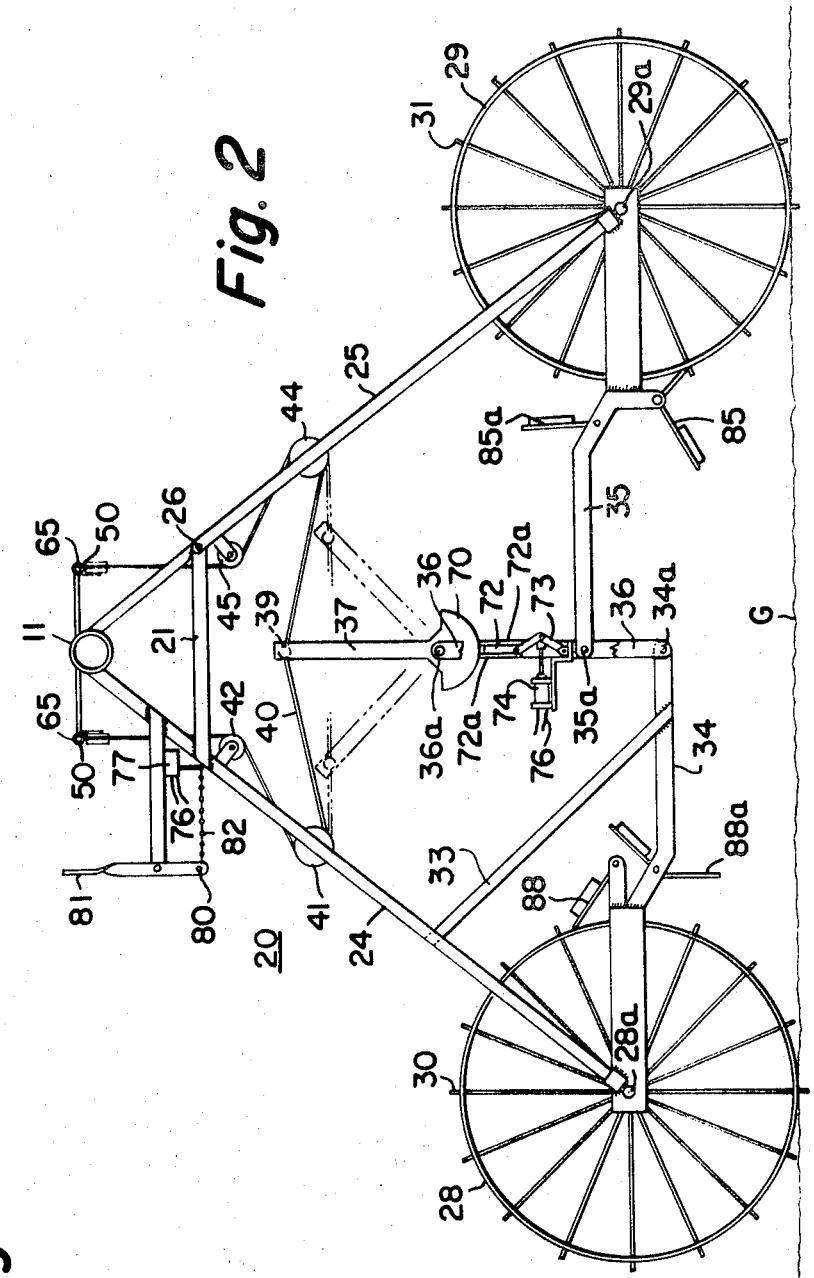

Sept. 9, 1969　　　　　L. P. SIEBERT　　　　　3,465,766
AMBULATORY IRRIGATING DEVICE
Filed April 28, 1967　　　　　　　　　　　　5 Sheets-Sheet 4
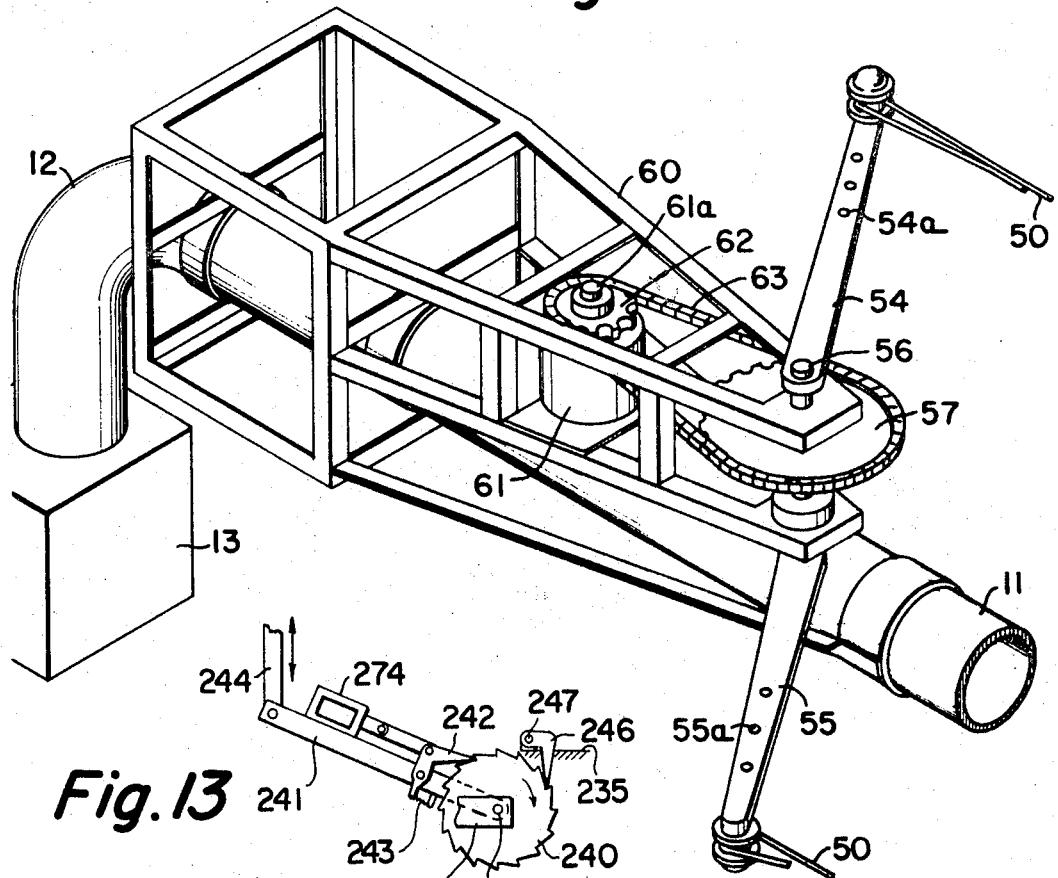
Fig. 7
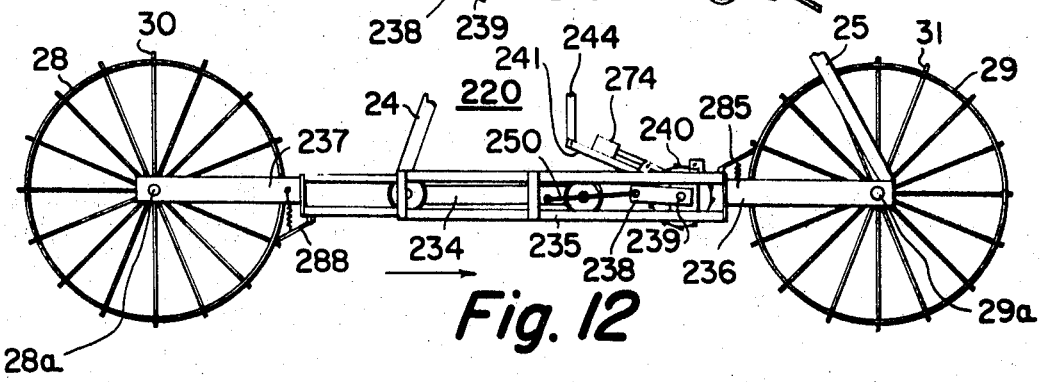
Fig. 13
Fig. 12

Sept. 9, 1969  L. P. SIEBERT  3,465,766
AMBULATORY IRRIGATING DEVICE
Filed April 28, 1967

United States Patent Office 3,465,766
Patented Sept. 9, 1969

3,465,766
AMBULATORY IRRIGATING DEVICE
Louie P. Siebert, Henderson, Nebr., assignor to Cropland Industries, Inc., Henderson, Nebr., a corporation of Nebraska
Filed Apr. 28, 1967, Ser. No. 634,638
Int. Cl. A01g *25/02;* B60p *3/30;* B05b *15/06*
U.S. Cl. 137—1     13 Claims

ABSTRACT OF THE DISCLOSURE

An ambulatory irrigating apparatus in which the towers for supporting the irrigation conduit include a pair of legs which are adapted to move across the ground by changing the spacing between the ground engaging foot portions on the legs.

Background of the invention

This invention relates to ambulatory irrigating apparatus for irrigating fields and the like and has for an object the provision of an apparatus for supporting an elongated irrigation conduit on a plurality of spaced towers and moving the towers and the irrigation conduit across a field while maintaining one end of the irrigation conduit connected to a water source for irrigating the field. The present invention also relates to the construction of the towers and the manner of moving the towers across the field and maintaining their alignment.

Ambulatory irrigating systems have been disclosed in the prior art for over fifty years. Such systems generally include an elongated irrigation conduit or pipe, one end of which is adapted to be connected to a source of water and the pipe is provided along its length at spaced intervals with outlets or nozzles for discharge of the water for irrigating a field. The most conventional system contemplates that one end of the pipe will be connected to a well located centrally in the field to be irrigated and the pipe will be supported at spaced intervals by a plurality of tractor devices which are adapted to move the pipe around the circular field with the pipe defining a radius of the circle. Such pipes are usually about one-quarter mile in length and thus such systems are capable of irrigating a circular field of one-half mile in diameter. Systems of this type can also be used to irrigate rectangular areas of ground by employing a flexible hose connected with a well with the hose being of sufficient length to allow the apparatus to travel over the predetermined area to be irrigated. Systems of this type are illustrated in the early Norton Patent 1,197,534 issued Sept. 5, 1916. When the irrigating pipe is adapted to travel in a circle with one end of the pipe located at the center of the circle, one of the problems involved is to keep the spaced tractor supporting means in alignment as they move around the circle, so as to maintain the various sections of the pipe in coaxial alignment. When the irrigating pipe is moved in this manner, it will be recognized that the tractor at the outer end of the pipe must travel the full distance of the circumference of the circle, whereas the various tractors located closer to the center of the circle will travel around circles of correspondingly shorter distances, depending on their spacing from the center of the circle. The alignment problems are less critical when moving the pipe across a rectangular field, since all of the tractor devices for supporting the pipe will move a uniform distance. One type of pipe alignment means is disclosed in Dick et al. Patent 2,800,364 issued July 23, 1957.

The various types of tractor means heretofore proposed have normally including wheeled vehicles in which each vehicle was independently driven by separate sources of power. For example, in the aforesaid Norton patent, the tractor units were adapted to be driven by a motor or engine preferably of the internal combustion type. In the Dick et al. patent, the tractor devices were adapted to be driven by electric motors. Other types of power drives have been proposed heretofore, including hydraulic motors and motors driven by the water in the irrigation system.

In another prior art arrangement, the vehicles for supporting the irrigation pipe were mounted on wheels and the drive was provided by movable intermediate legs for rolling the vehicles across the field. An example of such arrangement is disclosed in Sauer patent issued Dec. 29, 1891, wherein the movable legs are actuated by means of a reciprocating cable extending the entire length of the sprinkler pipe.

While the various prior art irrigating apparatus have been reasonably satisfactory, nevertheless they have left something to be desired. Some of the prior art systems have been rather expensive to construct and some have found considerable difficulty in providing suitable tractor arrangements which are capable of moving across a muddy field. The present invention provides an ambulatory irrigating system of relatively simple construction and one which is readily capable of moving across a muddy field.

Summary

The present invention provides an ambulatory irrigating device having an elongated irrigation conduit with one end adapted for connection to a water source and a plurality of spaced towers supporting the conduit at spaced locations therealong. Each of the towers is provided with a pair of supporting legs connected at their upper ends and each of the legs has ground engaging means at their lower ends. In the preferred form of the invention, such ground engaging means comprise wheel structures. The present invention also includes means for sequentially moving one of the ground engaging means relative to the other on each tower while maintaining the other ground engaging means stationary so as to change the spacing between the ground engaging means along the ground, whereby movement of one of the ground engaging means brings the ground engaging means closer together, while movement of the other of the ground engaging means moves the ground engaging means farther apart, thereby advancing the respective towers along the ground. The mechanism for moving the ground engaging means comprises a relatively simple mechanical linkage which is positioned well above the ground level to be free of the mud from the field and requires a very small amount of power to operate the linkage. An alignment system is included for controlling the coupling of the drive means to the mechanical linkage, in accordance with deviation of the towers from alignment.

Brief description of the drawing

FIG. 1 is an elevational view of an elognated irrigation conduit having one end connected to a source of water and having a plurality of spaced ambulatory towers for supporting the conduit;

FIG. 2 is a side elevation on large scale of one of the ambulatory supporting towers taken along the line 2—2 in FIG. 1;

FIG. 7 is a perspective view of the drive means for the towers shown in FIG. 1;

FIG. 8 is a fractional elevational view of a modification showing the preferred form of mounting the towers on the wheel structures;

FIG. 9 is a top plan view of FIG. 8;

FIG. 12 is a fractional side elevation view of modification of the mechanism for changing the spacing between the ground engaging supports for the ambulatory tower; and FIG. 13 is a fractional view on enlarged scale of parts shown in FIG. 12.

Description of the preferred embodiments

Figure 6:
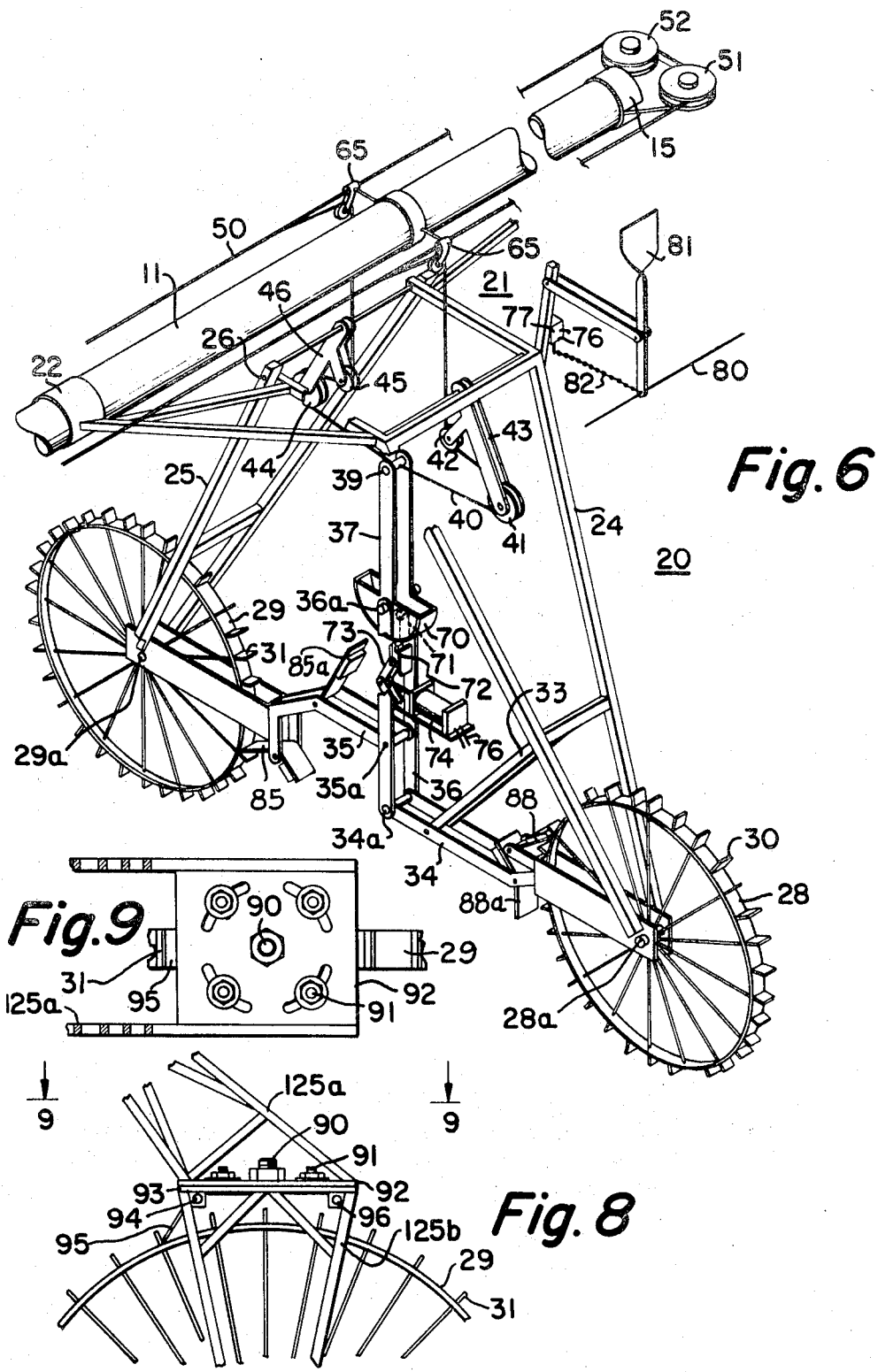
FIG. 6 is a perspective view of the ambulatory tower shown in FIG. 2.

Referring to FIG. 1, there is illustarted an ambulatory irrigating system 10 embodying the present invention. Such system comprises an elongated irrigation conduit 11 preferably comprising a plurality of sections of pipe joined together at the ends in a manner well known in the art. One end of the elongated irrigation conduit 11 is provided with an elbow section 12 which in turn is connected to a swivel unit 13, which in turn is connected to a pipe 14 extending from a source of water under pressure. The water pressure may be provided by any suitable means, for example, a pump, not shown. The outer end of the elongated irrigation conduit 11 is provided with a cap or closure member 15, as shown in FIG. 6. The irrigation conduit 11 is provided along its length at spaced intervals with suitable water outlet means such for example as spray nozzles, not shown, in a manner well nown in the art. The elongated irrigation conduit 11 is connected to a plurality of spaced ambulatory towers 20 which are adapted to engage the ground G. The towers 20 are positioned at spaced intervals along the irrigation conduit 11, the length of the intervals depending upon the type of pipe used in the conduit 11. For example, for aluminum pipe, the spacing is normally in the order of 70 feet between towers. For pipe of greater strength, such for example as steel pipe, the spacing may be as great as ninety feet or more between towers. The pipe is normally six inches in diameter and the overall length of the conduit 11 is in the order of one-quarter mile. Thus it will be seen that when the ambulatory towers 20 move the conduit 11 about the swivel 13 as the center, the conduit 11 is adapted to irrigate a circular area having an one-half mile diameter.

The ambulatory towers 20 are more clearly illustrated in FIGS. 2–6. As may be seen in FIGS. 2–6, each of the ambulatory towers includes a frame 21 made up of a plurality of rigidly connected structural members which are adapted to be connected to the pipe or elongated conduit 11 as indicated by members 22. Each of the towers 20 is proivded with a pair of legs 24 and 25 connected at their upper ends by a pivot 26. The lower ends of the legs 24 and 25 are provided with ground engaging means, which in the preferred form of the invention comprise rotatable wheels 28 and 29, respectively. The wheels 28 and 29 are each provided with lugs in the form radially extending projections 30 and 31, the purpose of which will be hereinafter described. The axles 28a and 29a of the wheels 28 and 29 are connected by a mechanical linkage comprising a pair of substantially horizontal members 34 and 35, which in turn are pivotally connected at their opposite ends to a substantially vertical member 36 by pivots 34a and 35a, as best shown in FIGS. 2 and 6. A support 33 connects member 34 with leg 24. The upper end of the vertical member 36 is pivotally connected to a second vertical member or link 37 by means of a pivot pin 36a.

The upper end of the member 37 is provided with a pin 39 to which is connected a flexible cable 40 which is adapted to pass over idler pulleys 41 and 42 carried by a stationary arm 43, FIG. 6, and idler pulleys 44 and 45 carried by a stationary arm 46, the arms 43 and 46 both being carried by the tower 20. The ends of the cable 40 are connected to a reciprocating drive cable 50 which extends the full length of the elongated irrigation conduit 11 and passes around a pair of pulleys 51 and 52 supported at the cap end of the conduit 11. The ends of the drive cable 50 are respectively connected to the crank arms 54 and 55, FIG. 7, which in turn are connected to the crank shaft 56, affixed to the sprocket wheel 57. The crank shaft 56 is journaled in a supportng frame 60 carried by the end of the irrigation conduit adjacent the water supply pipe 14, shown in FIG. 1. The frame 60 also supports the drive motor 61, which may be of any suitable type, depending upon the type of power which is available. In the preferred form, the motor is of the hydraulic type, having a gear 62 secured to the motor shaft 61a and having a roller chain 63 passing around the gear 62 and the sprocket wheel 57, FIG. 7.

The crank arms 54 and 55 may be of any desired length, depending upon the length of stroke desired for the reciprocating drive cable 50. As may be seen in FIG. 7, the crank arms 54 and 55 are provided with a series of openings 54a and 55a so that the arms may have their effective length shortened to decrease length of the stroke of the reciprocating drive cable 50. In one application of the invention, the crank arms 54 and 55 each had a length of two and one-half feet and the motor 61 was adapted to drive the crank shaft 56 at a speed of four and one-half r.p.m. The drive cable 50 is adapted to pass through suitable guide members 65 carried by the pipe on opposite sides thereof and at spaced intervals, one example being shown in FIG. 6.

The drive motor 61 is adapted to run continuously and thus the crank arms 54 and 55 will continuously reciprocate the drive cable 50. This in turn causes a continuous reciprocation of the takeoff cables 40 which deliver the driving power to the respective towers 20. Reciprocation of the cable 40, FIG. 2, will cause the upper link 37 to pivot about the pivot 36a and move from one phantom line position to the other at the opposite ends of the stroke. This action will continue so long as there is no coupling between the upper vertical link 37 and the lower vertical link 36 and no power will be delivered to the mechanical linkage connecting the legs 24 and 25 of the ambulatory tower 20. The purpose of this arrangement is to permit an ambulatory tower 20 to remain stationary and not advance with the other towers. As pointed out earlier in the specification, each of the towers 20 will travel a different distance during a complete cycle of the irrigation conduit through a revolution of 360° since the towers 20 are each positioned at different radial distances from the center of rotation which is located at pipe 14 in FIG. 1. Thus it will be apparent that the outermost ambulatory tower 20 will continuously advance throughout the entire cycle, whereas the intermediate towers 20 will advance to a lesser degree depending upon their radial distance from the center of the circle.

To effect a driving connection between the upper link 37 and the lower link 36, each of the ambulatory towers 20 is provided with a coupling arrangement. As may be seen in FIG. 6, the lower end of the upper link 37 has affixed thereto a semicircular member 70 having a tubular portion 71 extending therein. The lower vertical link 36 carries a vertically movable plunger 72 which is adapted to be actuated by means of a linkage 73 connected to a solenoid 74. The solenoid 74 is adapted to be operated from a suitable source electrical power, not shown. The solenoid 74 is adapted to be connected by electrical conductors 76 to a switch 77 carried by the frame 21 of the tower 20, FIGS. 2 and 6.

An alignment wire 80 extends the full length of the irrigation conduit 11 and interconnects the alignment flags 81 which are pivoted intermediate their ends on the respective towers 20. The lower ends of the flags 81 are connected by chains 82 to the respective switches 77, FIGS. 2 and 6. When one of the towers 20 gets out of alignment with the others, the alignment cable 80 will cause a pull on chain 82 to close the switch 77 and thereby energize the solenoid 74. The solenoid 74 operates the linkage 73 which in turn moves the plunger 72 upwardly between its guides 72a and against the member 70. When the upper link 37 is in its vertical position, as shown in FIGS. 2 and 6, the plunger 72 will be in alignment with the opening 71 in member 70, thereby permitting the plunger 72 to enter the opening 71 and couple the upper link 37 to the lower link 36. This coupling action transforms the two links 36 and 37 into a single rigid lever arm, the lower end of which is pivoted at 34a.

Figure 3:
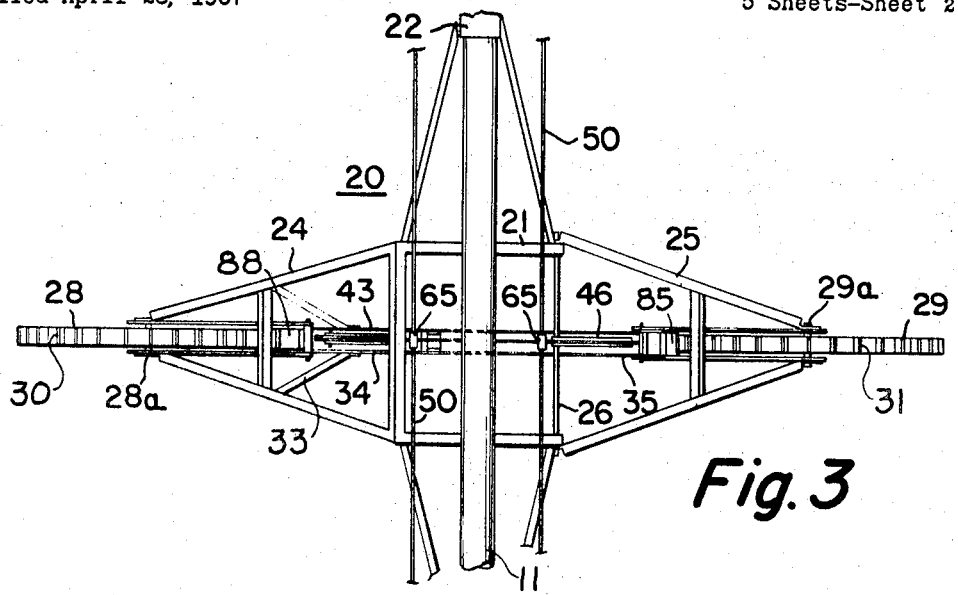
FIG. 3 is a top plan view of the ambulatory tower and portion of the irrigation conduit shown in FIG. 2.
Figure 4:
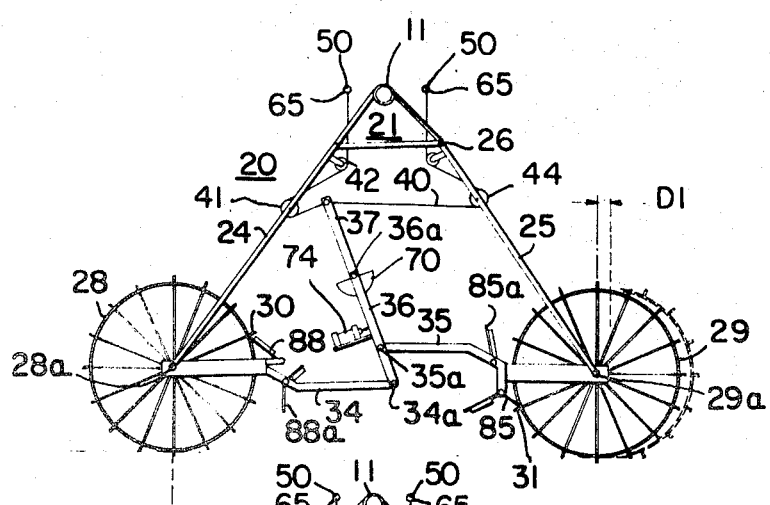
FIG. 4 is a view similar to FIG. 2 and showing the movement of the intermediate lever from its center position to its left-hand position with corresponding movement of the right-hand wheel.

Operation of the lever arm (links 36 and 37) will now be described in connection with FIGS. 2, 4, and 5. When the lever 36–37 moves from its full line position of FIG. 2 to the full line position of FIG. 4, it pivots about the lower pivot 34a, causing member 35 of the mechanical linkage interconnecting the wheels 28 and 29 to move to the left. This in turn causes the wheel 29 to move to the left from the phantom line position to the full line position as viewed in FIG. 4. It will be noted that a pawl member 85 pivotally carried by member 35 cooperates with the projections 31 on wheel 29 to act in the manner of a ratchet and pawl arrangement. It will be seen in FIG. 4 that the wheel 29 has advanced a distance D1 by movement of the lever arm 36–37 from the vertical position shown in FIG. 2 to the left-hand position shown in FIG. 4. During this movement, a pawl member 88 pivotally carried by member 34 has engaged one of the lugs or projections 30 on wheel 28, thereby preventing the wheel 28 from moving. Thus, during the above described operation, the leg 25 of the ambulatory tower 20 has pivoted about the pivot 26 and moved toward the stationary leg 24, thereby moving the wheel 29 closer to the wheel 28 by the distance D1 shown in FIG. 4.

Figure 5:
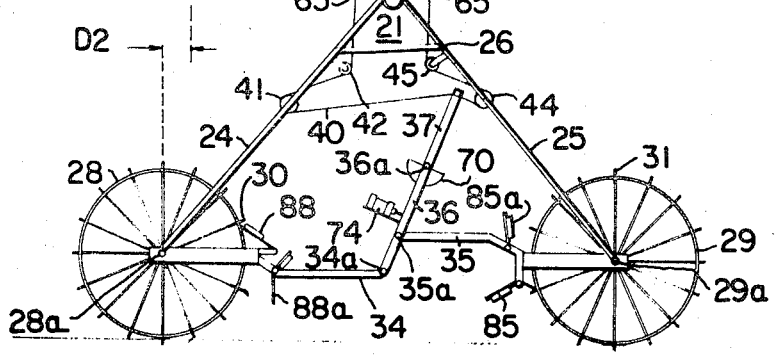
FIG 5 is a view similar to FIG. 4 and showing the intermediate lever moved to its right-hand position.

During the reverse stroke of the drive cable 50, the take off cable 40 causes the lever 36–37 to move to the right-hand position shown in FIG. 5. During this operation the leg 25 remains stationary under the influence of pawl 85 engaging the adjacent lug 31 on wheel 29 and the lever 36–37 is caused to pivot about pivot 35a. This causes the member 34 to move to the left, as viewed in FIG. 5, which in turn causes the wheel 28 to move to the left a distance indicated by the dimension D2 in FIG. 5. It will be noted that the leg 24 has moved away from the leg 25 and the wheel 28 has moved farther away from the wheel 29 by the distance indicated by the dimension D2. It will be noted that the distance D2 is equal to twice the distance indicated by D1 in FIG. 4. The reason for this is that the lever 36–37 only moved a half stroke from its center position in FIG. 2 to its left-hand position in FIG. 4, whereas in FIG. 5 the lever 36–37 has moved a full stroke from the left-hand position of FIG. 4 to the right-hand position of FIG. 5. It will be apparent that when the lever 36–37 moves from its right-hand position in FIG. 5 to its left-hand position of FIG. 4, the wheel 29 will move toward the wheel 28 a distance corresponding to the dimension D2, since this movement will also be a full stroke.

From the foregoing description, it will be seen that the pivotal movement of the lever 36–37 will cause the wheels 28 and 29 of the ambulatory towers 20 to move across the field in a step-by-step manner. Only one leg of the tower 20 moves at a time and the other leg remains stationary with respect to the ground engaging wheel. The operating mechanism for the mechanical linkage is of simple construction and is relatively light weight, requiring only a small amount of power for operation. The mechanism is not adversely affected by mud in the field, as the mechanism is supported well above the ground level. The mud in the field being irrigated does not interfere with the operation of the wheel structures. The wheels are adapted to sink into the mud approximately to a depth of eight inches and this does not interfere with the operation of the ambulatory towers 20.

When a tower 20 returns to its path of alignment with the other towers, the alignment cable 80 will have moved to a position to permit the chain 82 to close the contacts of the switch 77, thereby de-energizing the solenoid 74 FIG. 6. This causes the plunger 72 to drop to its disengaged position with respect to opening 71 in member 70, thereby decoupling the links 37 and 36 of the effective lever arm 36–37. In this decoupled position, the mechanical linkage connecting the wheels 28 and 29 will remain stationary and only the upper vertical link 37 will continue to move between its phantom line positions as shown in FIG. 2. During this operation the tower 20, as well as its legs 24 and 25, will remain stationary. The tower 20 only moves during the period of time when the links 36 and 37 are coupled together to form an effective lever arm 36–37, as previously described.

While the pawl members 85 and 88 have been illustrated in FIGS. 2, 4, 5, and 6 as being pivotally carried by the mechanical linkage interconnecting the wheels 28 and 29, in the preferred form of the invention, the pawl members are supported by the legs. As illustrated in FIGS. 8 and 9, the legs may be made in two sections, as indicated by sections 125a and 125b, FIG. 8, and the two sections secured together by bolts 90 and 91, which extend through a pair of plates 92 and 93, respectively welded to the leg sections 125a and 125b, FIG. 8. The plate 93 is provided with a pivotal support 94 for a pawl member 95. When the tower 20 is adapted to move in the reverse direction, the pawl 95 may be removed from its support 94 and mounted on the opposite support 96. The modification shown in FIGS. 2–6 is adapted for movement of the towers 20 in either direction and all that is necessary is to pivot the pawl members 85 and 88 out of their active or working positions to inactive positions and pivot the inactive pawl members 85a and 88a from their inactive positions as shown in FIGS. 2–6 to their active position in engagement with the lugs on the respective wheels 29 and 28.

Figure 10:
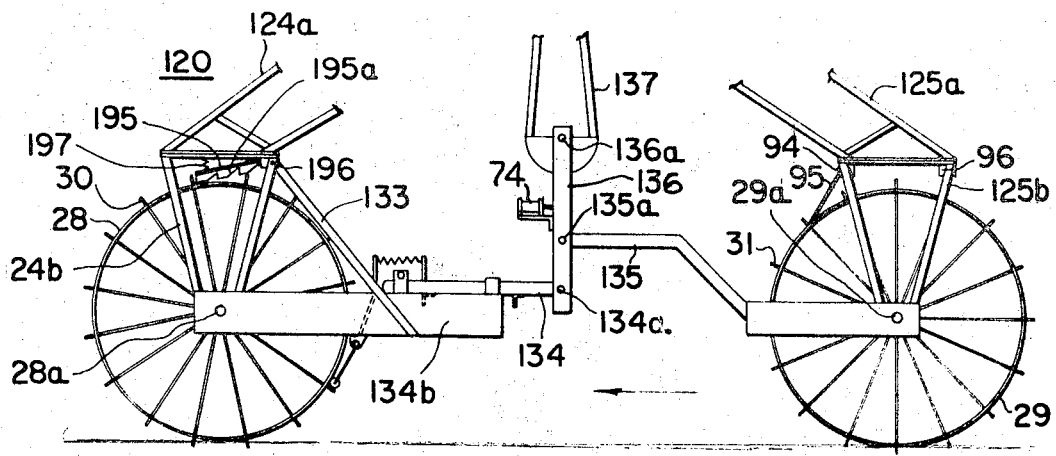
FIG. 10 is a side elevation view of a preferred modification of the invention utilizing the tower mounting construction of FIGS. 8 and 9.

Referring to FIG. 10 there is shown a preferred modification of the invention utilizing ambulatory towers 120. The tower 120 in many respects is similar to the tower 20 previously described in connection with FIGS. 2–6. The tower 120 is adapted to support the irrigation conduit (not shown) and is adapted to move across the field in the same manner as previously described in connection with FIGS. 1–6. For purposes of clarity the various parts of the tower 120 in FIG. 10 which correspond to parts of the tower 20 in FIGS. 2–6 are identified with corresponding reference numerals increased by 100. The frame (not shown) has rigidly connected thereto a leg 124a, the lower portion 124b of which is supported on the axle 28a of wheel 28. A second leg 125a is pivotally connected at its upper end to the frame and the lower leg portion 125b is supported on the axle 29a of wheel 29. The ambulatory tower 120 is adapted to move to the left as illustrated by the arrow in FIG. 10. Thus the pawl member 95 is carried by the pivotal support 94 and adapted to engage the lugs 31 on wheel 29 and thereby prevent the wheel 29 from rotating in a clockwise direction. Associated with the leg 124a–124b is a pawl or stop member 195 which is carried by pivotal support 196. The pawl member 195 is provided with a plurality of spaced teeth 195a which are selectively adapted to engage lugs 30 on the wheel 28, as hereinafter described. The pawl member 195 is adapted to be maintained against the lugs 30 on wheel 28 by means of a spring 197, FIG. 11. The teeth 195a on the pawl member 95 are spaced apart a distance less than the spacing between the lugs 30 so that one of the teeth 195a will engage a lug 30 regardless of the amount of forward movement of the wheel 28. This ensures that there is a minimum rollback or reverse rotation of the wheel 28.

The axles 28a and 29a of the wheels 28 and 29 are connected by a mechanical linkage comprising a pair of substantially horizontal members 134 and 135, which in turn are pivotally connected at their opposite ends to a substantially vertical member 136 by pivots 134a and 135a, respectively. Member 134 includes a second section 134b, which is connected to leg 124a–124b by means of a support 133. The upper end of the vertical member 136 is pivotally connected to a second vertical member or link 137 by means of a pivot pin 136a. The vertical members 136 and 137 are adapted to be connected together to form a common lever arm 136–137 by means of a solenoid controlled plunger as previously described and illustrated in connection with FIGS. 2–6. The reciprocating drive cable 50 is adapted to actuate the cable 40 for moving the upper end of member 137 in the same manner as the operation previously described in connection with FIGS. 2–6. In view of this, it is not believed necessary to repeat the description of that operation here.

Figure 11:
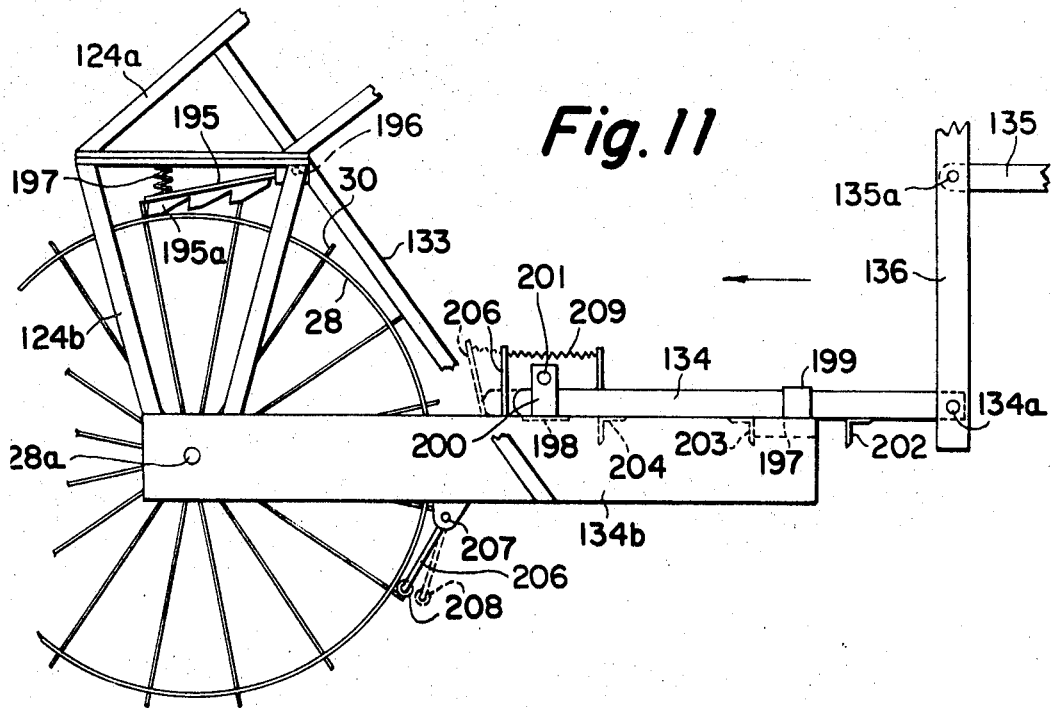
FIG. 11 is a fractional view on enlarged scale of a portion of FIG. 10.

Referring to FIG. 11, it will be seen that member 134 is adapted to move a short distance relative to the section 134b, the purpose of which will now be described. Section 134b is a yoke-shaped member, one end of which is supported on the axle 28a and the remote portion of section 134b is supported by the support member 133 from the leg 124a–124b. The upper portion of the section 134b is provided with a pair of plates 197 and 198 which in turn support guide members 199 and 200, the latter carrying a guide roller 201. The horizontal member 134 is adapted to pass through the guide members 199 and 200 and beneath the roller 201. The horizontal member 134 is provided with depending stop members 202, 203, and 204 which are adapted to engage the plate members 197 and 198. The section 134b also is adapted to support a bent lever 206 which is pivoted intermediate its ends at pivot 207. The lower end of lever 206 is provided with a roller 208 which is adapted to be spring biased against a lug 30 by means of a tension spring 209. The lever 206 is adapted to prevent the wheel 28 from rolling forward until power is applied in the direction of the arrow of the axle 28a.

With the parts shown in the full line position illustrated in FIG. 11, the member 134 is in its extreme position to the right. When the vertical lever arm 136–137 rotates about pivot 135a, member 134 moves to the left until stop 202 moves against the plate 197 and stop 204 moves against the plate 198 carried by the horizontal section 134b. During this movement of member 134 there is no movement of the horizontal section 134b and the wheel 28 is held against rotation in either direction by means of the forward roll preventing lever 206 and the backward roll preventing member or pawl 195. When member 134 has reached the end of its play and stop 202 is in engagement with the plate 197, the left-hand end or forward end of member 134 will have moved to its phantom line position against the upper end of lever 206, causing the roller 208 carried by the lower end of lever 206 to move out of engagement with the lug 30 on wheel 28. At this time, there will no longer be any relative movement between the member 134 and section 134b and thus the latter will move to the left in the direction of the arrow in FIG. 11, applying a force to the axle 28a and causing the wheel 28 to rotate in the counter-clockwise direction. The lugs 30 will pass under the teeth 195a on member 195, causing them to cam upwardly by reason of their shape.

When the horizontal member 134 and its section 134b reach the forward end of their stroke, as determined by movement of the vertical lever 136–137, the wheel 28 will have advanced a predetermined distance and the stop member 195 under the force of spring 197 will have moved one of its teeth 195a into locking position with respect to one of the lugs 30. This will prevent the wheel 28 from rolling back when lever 136–137 moves in the opposite direction, thereby causing the horizontal member 134 to move to the right and bring the stop 203 into engagement with the plate 197 on section 134b. At this time, the vertical lever 136–137 is adapted to move the horizontal member 135, FIG. 10, to the left and thereby advance the wheel 29. The movement of the wheels 28 and 29 in FIGS. 10 and 11 is accomplished in a similar manner as that previously described in connection with FIGS. 2–6. By reversing the position of the pawl or stop members 95 and 195 in manner to that previously described in connection with FIGS. 2–8, the tower 120 may be adapted to advance in the reverse direction, namely, to the right, as viewed in FIGS. 10 and 11.

Referring to FIG. 12, there is illustrated a modified ambulatory tower 220 embodying a modification of the mechanism for changing the spacing between the ground engaging supports for the ambulatory tower. The tower 220 includes a pair of legs or supports 24 and 25, similar to those illustrated in FIG. 2. The lower end of leg 25 is supported by the axle 29a of wheel 29 while the lower end of leg 24 is supported on the mechanical linkage that interconnects the axles 28a and 29a of wheels 28 and 29, respectively. This mechanical linkage is of the telescoping type and includes an outer frame or section 235 which is adapted to receive in telescoping relation, an inner section or carriage 234. The forward end of section 235 is connected to the axle 29a by a yoke member 236, while the rear end of the carriage 234 is connected to a similar yoke member 237, which in turn is connected to the axle 28a. The member 235 is adapted to rotatably support a crank 238 which is pinned to a shaft 239 and to which is also secured a ratchet wheel 240, FIG. 13. The shaft 239 is supported in bearings and pivoted on the rear end of the shaft 239 is a lever 241 which supports a pawl 242, which is normally spring-biased out of engagement with the ratchet teeth by means of a spring 243. A solenoid 274 when energized is adapted to hold the pawl 242 in engagement with the ratchet wheel 240. The free end of lever 241 is connected to a rod 244 which is adapted to be reciprocated vertically under the influence of the reciprocating drive cable 50, as previously described in connection with FIGS. 2–6.

The solenoid 274 corresponds to solenoid 74 illustrated in FIG. 2 and is adapted to be under control of switch 77 in the same manner as described in connection with FIGS. 2–6. Thus, no further explanation is believed necessary here. When the solenoid 274 is energized, the pawl 242 is held against the teeth of the ratchet wheel 240 in the manner illustrated in FIG. 13. Reciprocation of the lever 241 by means of member 244 under the influence of the reciprocating drive cable 50, not shown in FIG. 13, causes the ratchet wheel 240 to rotate in a clockwise direction. The ratchet wheel 240 is prevented from moving in a counterclockwise direction when the lever 241 moves in a counterclockwise direction by reason of the second pawl 246, which acts as a stop or brake for the ratchet wheel 240. The pawl 246 is pivotally carried at 247 by the frame member 235.

As the ratchet wheel 240 is moved in a clockwise direction, it causes the shaft 239 and the crank arm 238 pinned thereto likewise to rotate in a clockwise direction. The crank 238 extends outside of the frame member 235, FIG. 12, so that it may rotate through a full revolution. The opposite end of crank 238 is connected by means of a link 250 to the carriage 234, FIG. 12. Thus, when the crank arm 238 moves approximately 180° from its position illustrated in FIG. 12, the carriage 234 will have moved through its maximum stroke toward the right. This causes the axle 28a to move toward the axle 29a of the ground engaging wheels 28 and 29, respectively. During this movement of the crank 238, the stop member 285, which is spring-biased against the wheel 29, has been effective to engage one of the lugs 31 and prevent the wheel 29 from rotating in a counterclockwise direction. Since the wheel 28 has been rotating in a counterclockwise direction during the aforedescribed rotation of crank 238, the lugs 30 of wheel 28 have been passing under the spring-biased pawl or stop member 288, associated with wheel 28.

During the aforedescribed operation of crank 238 in FIG. 12, the ground engaging wheel 28 has been moved closer to the ground engaging wheel 29, although the legs 24 and 25 have remained in their original spaced relation. This is due to the fact that the legs 24 and 25 are supported on members 235 and 236, which do not telescope with respect to each other, but instead, maintain a fixed dimension. It will, of course, be understood that the leg 24 could be supported by the movable carriage 234, for example at a position adjacent the right hand end of member 237. With this construction, the leg 24 would move relative to the leg 25 whenever the carriage 234 moved relative to the outer member 235.

After the crank arm 238 has moved 180° from its position illustrated in FIG. 12, it will then start to move back to the position shown in FIG. 12. During this latter movement, the wheel 28 will be maintained in fixed position under the influence of stop 288 while wheel 29 will be caused to rotate in a clockwise direction, thereby moving the axle 29a away from the axle 28a of wheel 28. Thus it will be seen that the mechanism illustrated in FIGS. 12 and 13 will cause the wheels 28 and 29 to move across the ground in the same step-by-step manner as the mechanism illustrated in FIGS. 2–6 in connection with the ambulatory tower 20 and in FIGS. 10 and 11, in connection with the ambulatory tower 120.

It will be understood that the mechanism for controlling movement of the tower 220 in FIG. 12 also is adapted to move the towers in reverse direction across the field. This is accomplished in similar manner as for the other modifications of the towers. More specifically, the stop member 285 is removed from the top of section 235 and is pivotally secured to the bottom for operation similar to stop member 288 and stop member 288 is removed from its bottom position on cartridge 234 and mounted on the top thereof.

While the present invention has been described in connection with a reciprocating cable for supplying power to the ambulatory towers, it is to be understood that other types of power may be utilized. For example, hydraulic control may be provided on each of the towers with a hydraulic cylinder operating the vertical lever of the linkage. With such an arrangement, the solenoid control system may be replaced by such hydraulic system with the latter receiving a signal from the irrigation pipe to control actuation of the respective hydraulic cylinders and alignment of the towers. It will be understood that regardless of the type of power supplied to operate the vertical lever of the mechanical linkage interconnecting the wheels of the tower, the manner of moving the wheels with respect to each other to advance the tower across the field will be the same.

What is claimed is:
1. An ambulatory irrigating device comprising:
   an elongated irrigation conduit having one end adapted for connection to a water source,
   a plurality of spaced towers supporting said conduit at spaced locations therealong, each of said towers having a pair of supporting legs connected at their upper ends, each of said legs having ground engaging means at their lower ends, and
   means for sequentially moving while on the ground one of said ground engaging means relative to the other on each tower while maintaining said other ground engaging means stationary on the ground so as to change the spacing between said ground engaging means along the ground whereby movement of one of said ground engaging means brings said ground engaging means closer together while movement of the other of said ground engaging means moves said ground engaging means farther apart thereby advancing the respective towers along the ground.

2. An ambulatory irrigating device according to claim 1 wherein said last-named means includes drive means for supplying power to move said ground engaging means of said towers, and means on said towers for coupling said drive means to said ground engaging means of the corresponding towers.

3. An ambulatory irrigating device according to claim 2 including alignment means carried by said towers for selectively controlling said coupling means on the corresponding towers in accordance with deviation of said towers from alignment.

4. An ambulatory tower for supporting an irrigation conduit in an ambulatory irrigating device comprising:
   supporting structure having a pair of ground engaging means at the lower end thereof,
   a mechanical linkage connecting each of said ground engaging means, and
   means for actuating said mechanical linkage for sequentially moving while on the ground one of said ground engaging means relative to the other while maintaining said other ground engaging means stationary on the ground so as to change the spacing between said pair of ground engaging means along the ground whereby movement of one of said ground engaging means brings said pair of ground engaging means closer together while movement of the other of said ground engaging means moves said pair of ground engaging means farther apart, thereby advancing said tower along the ground.

5. An ambulatory tower according to claim 4 wherein said mechanical linkage includes intermediate lever means, and said actuating means includes means for coupling said intermediate lever means to power driven means.

6. An ambulatory tower according to claim 4 wherein said means for actuating said mechanical linkage comprises rotatable means for adjusting the effective length of said mechanical linkage to vary the spacing between said ground engaging means at the lower ends of said legs.

7. An ambulatory tower according to claim 4 wherein said supporting structure comprises a pair of legs pivotally connected at their upper ends and each of said legs having one of said ground engaging means at their lower ends.

8. An ambulatory tower according to claim 4 wherein said supporting structure comprises a frame including a plurality of rigidly connected structural members and a pair of legs supporting said frame, one of said legs being pivotally connected to said frame and each of said legs at its lower end having one of said ground engaging means.

9. An ambulatory tower according to claim 4 wherein said pair of ground engaging means comprises wheel structures, and means for locking said wheel structures for rotation in one direction only.

10. An ambulatory tower according to claim 9 wherein said wheel structures have radial projections and said locking means comprises mechanical stops carried by said tower and adapted to engage said radial projections.

11. An ambulatory tower according to claim 9 including means associated with one of said wheel structures for preventing rollback thereof.

12. An ambulatory tower comprising:
   supporting structure having a pair of ground engaging wheels at the lower end thereof,
   a mechanical linkage connecting the axles of each of said wheels, said mechanical linkage being adjustable to adjust the spacing between said axles of said wheels, and
   means for actuating said mechanical linkage for sequentially moving while on the ground one of said wheels relative to the other while maintaining said other stationary on the ground so as to change the spacing between said axles of said wheels whereby movement of one of said wheels brings said wheels closer together while movement of the other of said wheels moves said wheels farther apart, thereby advancing said tower.

13. In an ambulatory irrigating system having an elongated irrigation conduit with one end adapted for connection to a water source and a plurality of spaced towers supporting the conduit at spaced locations therealong, each of the towers having a pair of supporting legs connected at their upper ends and each of the legs having ground engaging means at their lower ends, the method of sequentially moving while on the ground one of the ground engaging means relative to the other on each tower while maintaining the other ground engaging means stationary on the ground so as to change the spacing between the ground engaging means along the ground whereby movement of one of the ground engaging means brings the ground engaging means closer together while movement of the other of the ground engaging means moves the ground engaging means farther apart thereby advancing the respective towers along the ground.

References Cited
UNITED STATES PATENTS

| | | | |
|---|---|---|---|
| 3,223,461 | 12/1965 | Stout | 137—344 XR |
| 3,230,969 | 1/1966 | Purtell | 137—344 XR |
| 3,268,174 | 8/1966 | Boone | 137—344 XR |
| 3,302,656 | 2/1967 | Boone | 137—344 XR |
| 3,302,883 | 2/1967 | Stout | 137—344 XR |
| 3,373,939 | 3/1968 | Dowd | 137—344 XR |
| 3,381,893 | 5/1968 | Smith et al. | 137—344 XR |

SAMUEL SCOTT, Primary Examiner

U.S. Cl. X.R.

137—344; 239—212